United States Patent
Li et al.

(10) Patent No.: US 9,189,318 B2
(45) Date of Patent: Nov. 17, 2015

(54) PATH-SENSITIVE ANALYSIS FRAMEWORK FOR BUG CHECKING

(71) Applicant: Oracle International Corporation, Redwood Shores, CA (US)

(72) Inventors: Lian Li, Carindale (AU); Cristina N. Cifuentes, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/188,552

(22) Filed: Feb. 24, 2014

(65) Prior Publication Data
US 2014/0344633 A1    Nov. 20, 2014

Related U.S. Application Data

(60) Provisional application No. 61/823,801, filed on May 15, 2013.

(51) Int. Cl.
G06F 11/07    (2006.01)

(52) U.S. Cl.
CPC .................................. G06F 11/0784 (2013.01)

(58) Field of Classification Search
None
See application file for complete search history.

(56) References Cited

U.S. PATENT DOCUMENTS

| | | | | |
|---|---|---|---|---|
| 7,047,523 | B1* | 5/2006 | Liggesmeyer | 717/132 |
| 7,900,193 | B1* | 3/2011 | Kolawa et al. | 717/126 |
| 2005/0166167 | A1* | 7/2005 | Ivancic et al. | 716/5 |
| 2007/0005633 | A1* | 1/2007 | Ball et al. | 707/102 |
| 2009/0193401 | A1* | 7/2009 | Balakrishnan et al. | 717/144 |
| 2010/0305919 | A1* | 12/2010 | Ganai et al. | 703/2 |
| 2011/0145799 | A1* | 6/2011 | Bartolomeo | 717/132 |
| 2012/0174074 | A1* | 7/2012 | Ganai | 717/126 |
| 2012/0304153 | A1 | 11/2012 | Li et al. | |
| 2013/0031531 | A1* | 1/2013 | Keynes et al. | 717/126 |

OTHER PUBLICATIONS

Amellal etl al., Scheduling of a Control and Data Flow Graph, Ecole Polytechnique de Montreal, Electrical Engineering Deaprtment, May 3-6, 1993.*

Meliou et al., Tracing Data Errors with View-Conditioned Causality, Sigmod '11, 2011, 505-516.*

(Continued)

*Primary Examiner* — Don Wong
*Assistant Examiner* — Reshaun M Finkley
(74) *Attorney, Agent, or Firm* — Osha Liang LLP

(57) ABSTRACT

A method for performing path-sensitive data-flow analysis for use in error checking functions includes identifying at least a first instruction and a second instruction in a control flow graph of a function. The identified first instruction and second instruction are connected by at least a first control flow path and a second control flow path. The method further includes defining a path condition between the first instruction and the second instruction as a complex disjunction including a first conjunction of predicates for the first control flow path and a second conjunction of predicates for the second control flow path. The method further includes converting the path condition into conjunctive normal form to obtain a converted path condition that includes a disjunction of atomic constraints, generating a simplified path condition by simplifying the disjunction of atomic constraints in the converted path condition to a value, analyzing the function using the simplified path condition to detect an error, and presenting the error.

17 Claims, 5 Drawing Sheets

(56) References Cited

OTHER PUBLICATIONS

Ball, T. and Rajamani, S. K; "Bebop: a path-sensitive interprocedural dataflow engine;" PASTE '01; Snowbird, Utah; Jun. 18-19, 2001 (7 pages).

Bodik, R. and Amik, S; "Path-sensitive value-flow analysis;" POPL '98: Proceedings of the 25th ACM SIGPLAN-SIGACT symposium on Principles of programming languages; San Diego, CA, Jan. 1998 (15 pages).

Cherem, S., Princehouse, L., and Rugina, R; "Practical memory leak detection using guarded value-flow analysis;" Proceedings of the 2007 ACM SIGPLAN conference on Programming language design and implementation; PLDI '01; Jun. 11-13, 2007; San Diego, CA (12 pages).

Choi, J., Cytron, R., and Ferrante, J; "Automatic construction of sparse data flow evaluation graphs;" Proceedings of the 18th ACM SIGPLAN-SIGACT symposium on Principles of programming languages; POPL '91; New York, NY; 1991 (12 pages).

Cifuentes, C., Keynes, N., Li, L., Hawes, N., Valdiviezo, M., Browne, A., Zimmerman, J., Craik, A., Teoh, D., and Hoermann, C; "Static deep error checking in large system applications using parfait;" Proceedings of the 19th ACM SIGSOFT symposium and the 13th European conference on Foundations of software engineering; ESEC-FSE '11; Sep. 5-9, 2011; Szeged, Hungary (4 pages).

Das, M., Lerner, S., and Seigle, M; "ESP: Path-sensitive program verification in polynomial time;" Proceedings of the Conference on Programming Language Design and Implementation; PLDI '02; Jun. 17-19, 2002; Berlin, Germany (12 pages).

Dillig, I., Dillig, T., and Aiken, A; "Sound, complete and scalable path-sensitive analysis;" Proceedings of the 2008 ACM SIGPLAN conference on Programming language design and implementation; PLDI '08; Jun. 7-13, 2008; Tucson, Arizona (11 pages).

Dor, N., Adams, S., Das, M., and Yang, Z; "Software validation via scalable path-sensitive value flow analysis;" Proceedings of the 2004 ACM SIGSOFT international symposium on Software testing and analysis; ISSTA '04; Jul. 11-14, 2004; Boston, MA (11 pages).

Li, L., Cifuentes, C., and Keynes, N; "Boosting the performance of flow-sensitive points-to analysis using value flow;" Proceedings of the 19th ACM SIGSOFT symposium and the 13th European conference on Foundations of software engineering; ESEC/FSE '11; Sep. 5-9, 2011; Szeged, Hungary (11 pages).

Hampapuram, H., Yang, Y and Das, M; "Symbolic path simulation in path-sensitive dataflow analysis;" Proceedings of the 6th ACM SIGPLAN-SIGSOFT workshop on Program analysis for software tools and engineering; Paste '05; Sep. 5-6, 2005; Lisbon, Portugal (7 pages).

* cited by examiner

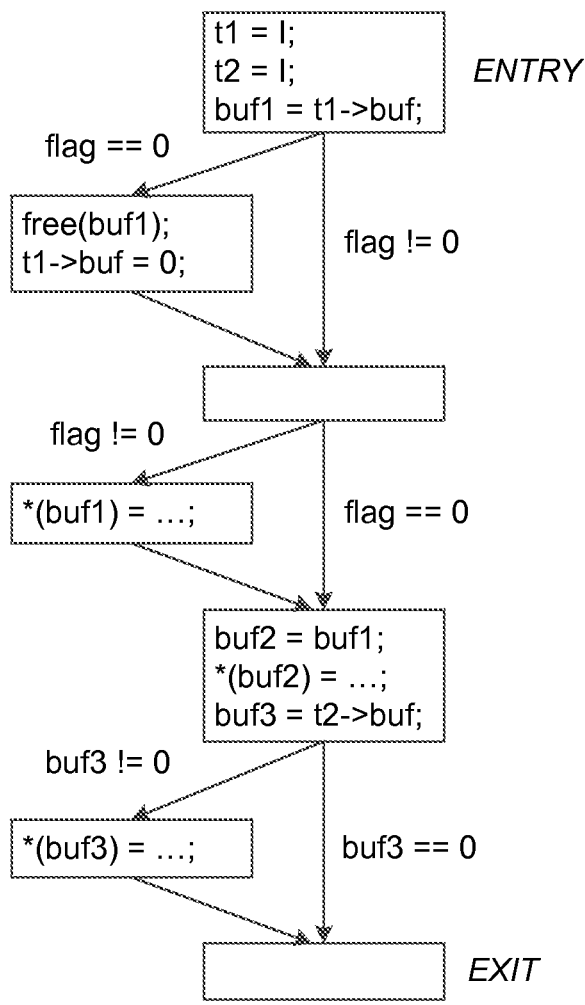
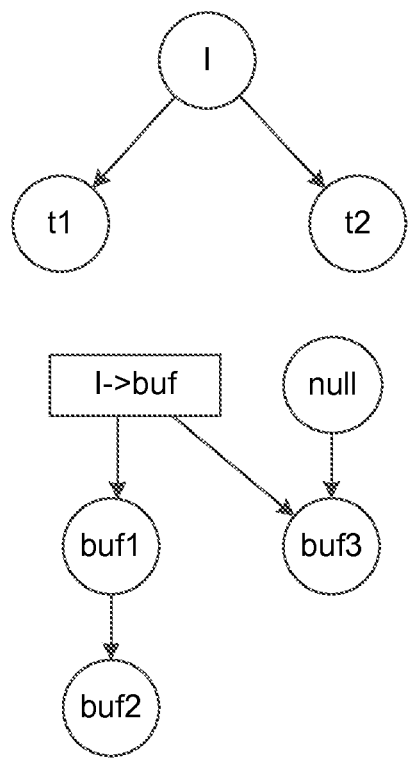
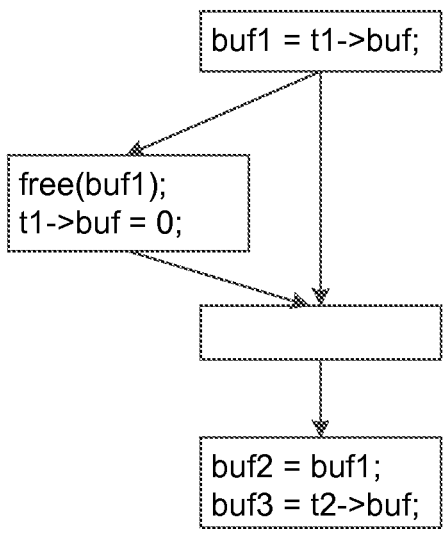
FIG. 4
FIG. 5
FIG. 6

PATH-SENSITIVE ANALYSIS FRAMEWORK FOR BUG CHECKING

CROSS-REFERENCE TO RELATED APPLICATIONS

This application is a non-provisional of U.S. Provisional Application No. 61/823,801, filed on May 15, 2013, and entitled: "Path-Sensitive Analysis Framework for Bug Checking." Accordingly, this application claims priority to U.S. Provisional Application No. 61/823,801 under 35 U.S.C. §119(e). U.S. Provisional Application No. 61/823,801 is hereby incorporated by reference in its entirety.

BACKGROUND

In the process of developing a computer program, various errors may be introduced in the computer program that cause unintentional consequences, such as the program being unable to execute or returning incorrect results. In order to minimize and potentially prevent such errors, program analysis is performed. Program analysis is the process of automatically analyzing the behavior of computer programs during actual or modeled execution. The program analysis may be static or dynamic. Static program analysis is performed without executing the program, whereas dynamic program analysis is performed during the execution of the program.

SUMMARY

In general, in one aspect, the invention relates to a method for performing path-sensitive data-flow analysis for use in error checking functions, including identifying at least a first instruction and a second instruction in a control flow graph of a function. The identified first instruction and second instruction are connected by at least a first control flow path and a second control flow path. The method further includes defining a path condition between the first instruction and the second instruction as a complex disjunction including a first conjunction of predicates for the first control flow path and a second conjunction of predicates for the second control flow path. The method further includes converting the path condition into conjunctive normal form to obtain a converted path condition that includes a disjunction of atomic constraints, generating a simplified path condition by simplifying the disjunction of atomic constraints in the converted path condition to a value, analyzing the function using the simplified path condition to detect an error, and presenting the error.

In general, in one aspect, the invention relates to a system for performing path-sensitive data-flow analysis for use in error checking functions, including memory and a computer processor for executing a static analysis application stored in memory and causing the computer processor to identify at least a first instruction and a second instruction in a control flow graph of a function. The identified first instruction and second instruction are connected by at least a first control flow path and a second control flow path. The static analysis application further causes the computer processor to define a path condition between the first instruction and the second instruction as a complex disjunction including a first conjunction of predicates for the first control flow path and a second conjunction of predicates for the second control flow path. The static analysis application further causes the computer processor to convert the path condition into conjunctive normal form to obtain a converted path condition that includes a disjunction of atomic constraints, generate a simplified path condition by simplifying the disjunction of atomic constraints in the converted path condition to a value, analyze the function using the simplified path condition to detect an error, and present the error.

In general, in one aspect, the invention relates to a non-transitory computer readable medium storing instructions for performing path-sensitive data-flow analysis for use in error checking functions. The instructions are executable on a computer processor and include functionality to identify at least a first instruction and a second instruction in a control flow graph of a function. The identified first instruction and second instruction are connected by at least a first control flow path and a second control flow path. The instructions further include functionality to define a path condition between the first instruction and the second instruction as a complex disjunction including a first conjunction of predicates for the first control flow path and a second conjunction of predicates for the second control flow path. The instructions further include functionality to convert the path condition into conjunctive normal form to obtain a converted path condition that includes a disjunction of atomic constraints, generate a simplified path condition by simplifying the disjunction of atomic constraints in the converted path condition to a value, analyze the function using the simplified path condition to detect an error, and present the error.

Other aspects of the invention will be apparent from the following description and the appended claims.

BRIEF DESCRIPTION OF DRAWINGS

FIG. 4 shows an example graph in accordance with one or more embodiments of the invention.

FIG. 5 shows an example graph in accordance with one or more embodiments of the invention.

FIG. 6 shows an example graph in accordance with one or more embodiments of the invention.

DETAILED DESCRIPTION

Figure 1:
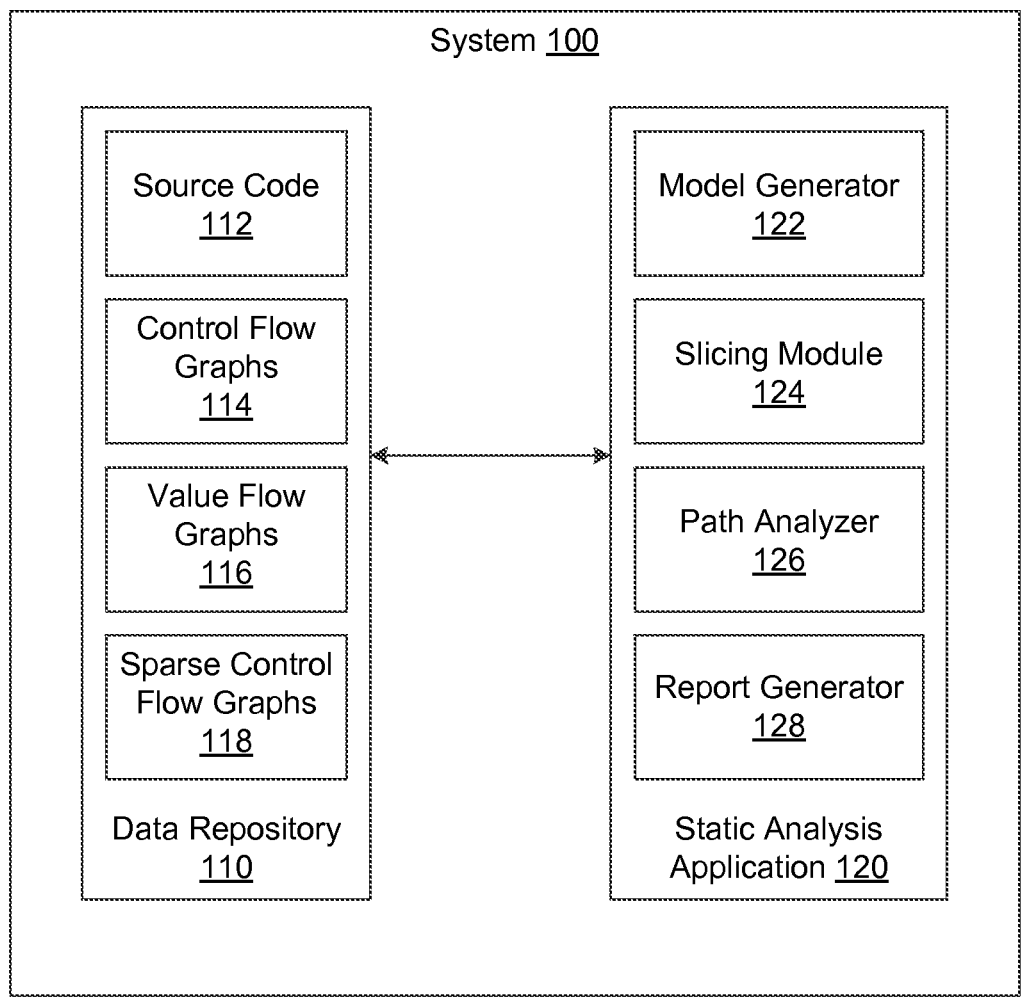
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the present invention provide a mechanism for path sensitive data-flow analysis for error checking one or more functions. One or more embodiments of the invention identify at least two instructions in a control flow graph of the function whereby multiple different paths may be taken from the first instruction to the second instruction. Due to the multiple paths between the instructions, a path condition is defined that is a complex disjunction of predicates. One or more embodiments of the invention generate a simplified path condition from the complex disjunction and use the simplified path condition to analyze the function and detect an error.

In one or more embodiments of the invention, data value flows and control flows are modeled at the same time. The combination of performing data value flows and control flows provides a simple yet effective approximation in computing path conditions between two instructions efficiently. Although the below description focuses primarily on detecting use-after-free defects, the following system and methods are applicable to general-purpose analyses for checking arbitrary finite-state machine properties.

FIG. 1 shows a schematic diagram of a system in accordance with one or more embodiments of the invention. The system (100) includes a data repository (110) storing source code (112), control flow graphs (114), value flow graphs (116), and sparse control flow graphs (118). The system also includes a static analysis application (120) that further includes a model generator (122), a slicing module (124), a path analyzer (126), and a report generator (128). Each of these components is described below.

In one or more embodiments of the invention, the data repository (110) is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments of the invention, the data repository may store source code (112), control flow graphs (114), value flow graphs (116), sparse control flow graphs (118), and any other data supporting data-flow analysis and value-flow analysis of functions in the source code.

In one or more embodiments of the invention, source code (112) is a collection of computer instructions (i.e. statements) written using a human-readable computer programming language. The source code (112) stored on the data repository (110) according to one or more embodiments of the present invention is not compiled and executed code, but rather is subjected to dataflow analysis in order to identify potential errors present in the source code (112). Source code (112) may include sequences of program instructions that perform one or more tasks, called functions. A function may be a method, a procedure, or another collection of program instructions.

Source code (112) may include references to variables, which are storage locations in memory associated with a symbolic identifier (e.g., x) and having some known or unknown value. A pointer variable is a subtype of variable whose value refers directly to, or "points" to, the address of another value stored elsewhere in memory. Accessing the pointed-to value using the pointer variable is termed dereferencing the pointer.

Source code (112) may include one or more conditional branch instructions. A conditional branch instruction is an instruction that causes the computer program to begin execution of a different instruction sequence based on the result of a condition. In other words, the computer program may execute any one of two or more instruction sequences based on the result of a condition defined in the conditional branch instruction. Each instruction sequence is associated with a predicate, whereby the instruction sequence executes only if the predicate is true. The predicate for each instruction sequence from a conditional branch instruction is defined, at least in part, by the condition of the conditional branch instruction.

In one or more embodiments of the invention, a control flow graph (114) is a representation, using graph notation, of all paths that may be traversed through the instructions in a function during the function's execution. In one or more embodiments of the invention, a control flow graph (114) is a directed graph. Each node in the control flow graph (114) is a program point corresponding to a program statement. An edge exists from a first node in the control flow graph (114) to a second node in the control flow graph (114) if and only if execution of the function may proceed from executing the first node to executing the second node. A control flow path is a path from a first node to a second node in the control flow graph, whereby the path may include one or more intermediary nodes. In other words, the existence of the control flow path means that the execution of the function may proceed from executing the program statement in the first node to optionally executing the program statement in one or more intermediary nodes to executing the program statement in the second node.

The control flow graph (114) may be defined using the notation: G=<N, E> where N is a finite set of nodes that includes program points corresponding to program statements and E is the set of edges and a subset of N×N corresponding to the control flow between the nodes. By convention, a unique, single entry node entry $\in$N and a unique, single exit node exit $\in$N exist in the control flow graph (114). Given nodes $n_1$ and $n_2$, $(n_1, n_2)$ designates that an edge exists from $n_1$ to $n_2$. In other words, $(n_1, n_2)$ belongs to E. Given a control flow graph <N, E>, a control flow path, which may be denoted by $\pi$, in the control flow graph (114) is a sequence of nodes $n_1, \ldots, n_m$ such that $(n_i, n_{i+1}) \in$E for $1 \leq i \leq m-1$. The exact information in each node depends on the level of abstraction.

In one or more embodiments of the invention, a value flow graph (116) is a data dependence graph with nodes representing program variables and edges representing dependencies between variables. In particular, an edge exists from a first node in the value flow graph (116) to a second node in the value flow graph (116) if and only if the value of the program variable in the second node is dependent on the value of the program variable in the first node. In a value flow graph (116), location p flows to location q if the value at p is assigned to q. This assignment may occur directly, via non-pointer variables, or indirectly, via pointers.

Auxiliary variables may be introduced in the local value flow graph (116) of a function to represent dereferences of function inputs (e.g., formal parameters and introduced auxiliary variables as inputs) and outputs (e.g., heap objects escaping from the function). The introduced auxiliary variables explicitly model inter-procedural memory dependencies, and allow each function to be analyzed individually without having to trace the inter-procedural dependencies.

In one or more embodiments of the invention, edges in the value flow graph (116) are either may flow-to edges and must flow-to edges. May flow-to edges may be denoted using the notation, "$\Rightarrow^{may}$" and must flow-to edges may be denoted using the notation, "$\Rightarrow^{must}$". Edges which have a direct value flow are must flow-to edges. Also, if an indirect value flow edge dereferences the same variables, or if the indirect value flow edge refers to the same abstract location which represents one address at runtime, then the indirect value edge is a must flow-to edge. Otherwise, the edge is a may flow-to edge. The symbol $\Rightarrow^*$ is used to denote the reflexive transitive closure of the flow-to edges.

Sparse control flow graphs (118) are a species of control flow graphs (114). The data repository (110) may store one or more control flow graphs (114) including all or many of the instructions in a given function. Simultaneously, the data repository (110) may store sparse control flow graphs (118) including only the instructions relevant to the sparse data-flow analysis performed by the static analysis application. Sparse control flow graphs (118) are further described with respect to FIG. 2 below.

In one or more embodiments of the invention, the static analysis application (120) is configured to perform path-sensitive data-flow analysis on functions in the source code (112), for the purpose of identifying potential bugs (i.e., errors) included within. The analysis being path-sensitive means that the analysis performs computations dependent on the predicates at conditional branch instructions. For example, if a particular branch of a function includes a condition "x>0", then on one path, the analysis is performed such that x>0, and on the other path, the analysis proceeds such that x≤0. Such analyses are performed using control flow graphs (114), value flow graphs (116), and sparse control flow graphs (118) generated from the function. For example, and without limitation, analyses performed by the static analysis application may identify potential use-after-free errors, dangling pointer errors, and data race errors. In one or more embodiments of the invention, the static analysis application (120) includes a model generator (122), a slicing module (124), a path analyzer (126), and a report generator (128).

In one or more embodiments of the invention, the model generator (122) includes functionality to generate control flow graphs (114), value flow graphs (116), and sparse control flow graphs (118) from a given function in the source code. In one or more embodiments, the model generator (122) generates such graphs according to the steps delineated in the discussion of FIG. 2 below.

In one or more embodiments of the invention, the slicing module (124) includes functionality to traverse a value flow graph (116) and remove from the value flow graph (116) any variables not relevant to the analysis performed by the static analysis application (120). In one or more embodiments, the slicing module (124) slices value flow graphs (116) into value flow graph slices according to the steps delineated in the discussion of FIG. 2 below.

In one or more embodiments of the invention, the path analyzer (126) includes functionality to enumerate all possible paths between two instructions in a function. The path analyzer (126) includes functionality to compute a path condition between a first instruction and a second instruction. A path condition is a representation of all values that must be true in order to reach or execute the second instruction after executing the first instruction. In other words, the path condition may be a function of the set of predicates in one or more paths from the first instruction to the second instruction. Furthermore, the path analyzer (126) includes functionality to simplify the path condition.

In one or more embodiments of the invention, the report generator (128) includes functionality to generate a report. The report may include a summary of the processed value flow graph for the function in order to enable interprocedural analysis for the entire program. Alternatively or additionally, the report may include a list of defects in the program, suggestions to correct the defects in the program, or a list of one or more corrections to the program to correct the defects.

While FIG. 1 shows a configuration of components, other configurations may be used without departing from the scope of the invention. For example, various components may be combined to create a single component. As another example, the functionality performed by a single component may be performed by two or more components.

Figure 2:
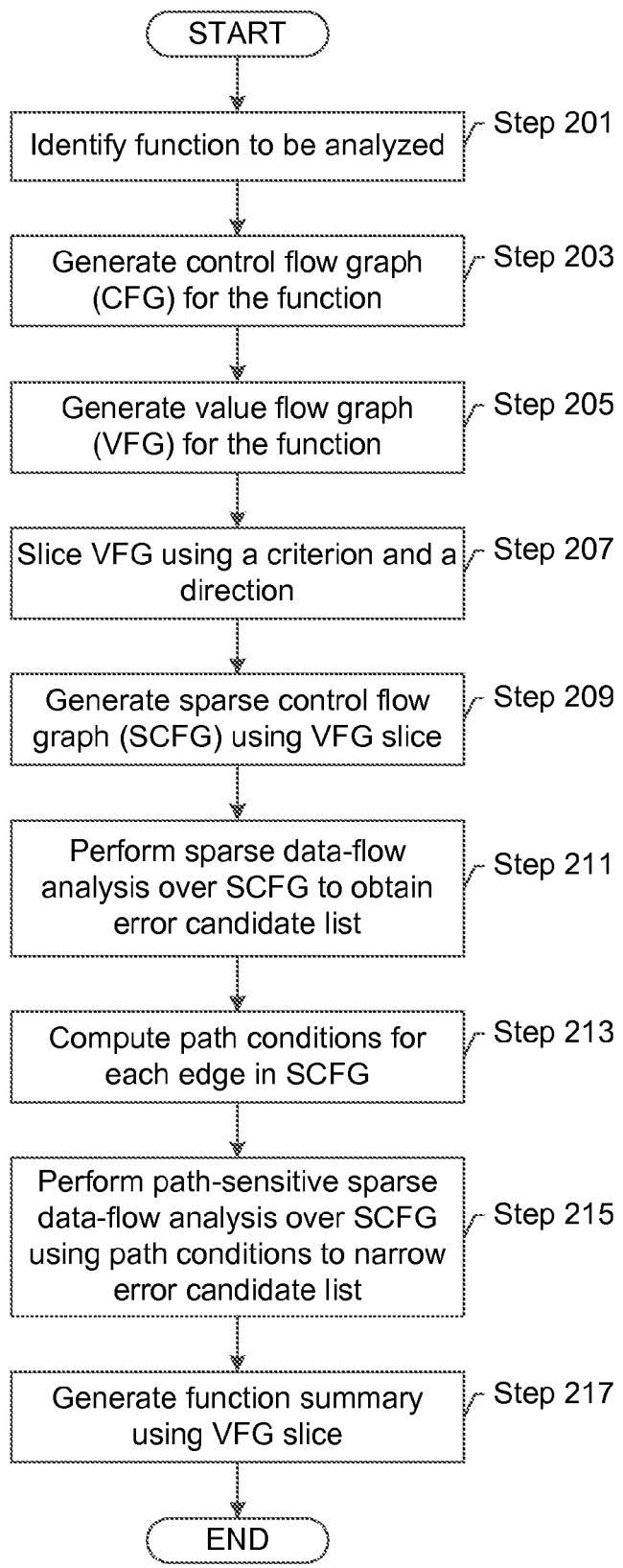
FIG. 2 shows a flowchart in accordance with one or more embodiments of the invention.
Figure 3:
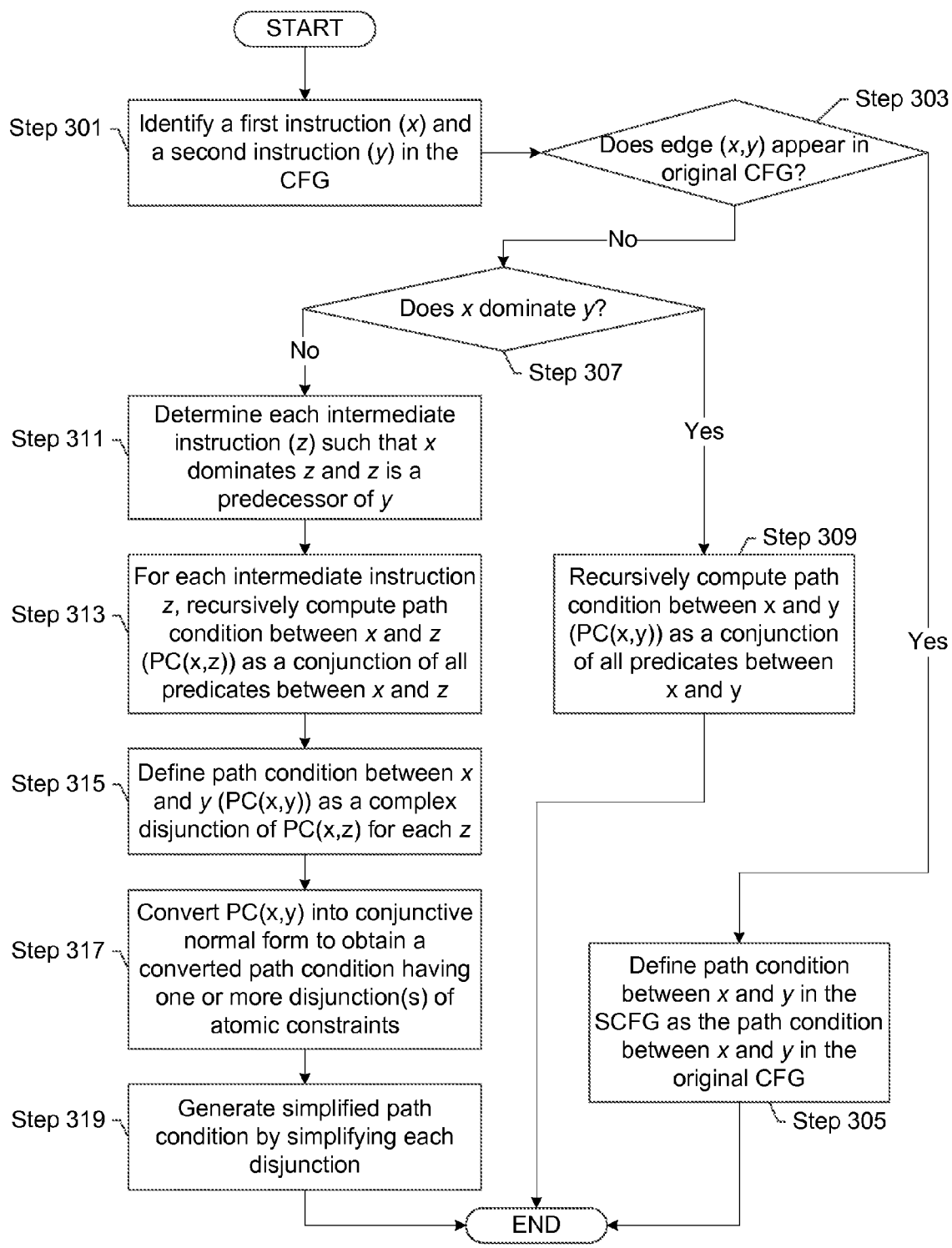
FIG. 3 shows a flowchart in accordance with one or more embodiments of the invention.

FIGS. 2-3 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for computing path conditions and performing dataflow analysis on a function in accordance with one or more embodiments of the invention. The process shown in FIG. 2 may be used, for example, with the system of FIG. 1 to perform the analysis.

In Step 201, the function to be analyzed is identified. In one or more embodiments of the invention, each function in a program is identified and the remaining steps shown in FIG. 2 are performed on the functions individually.

In Step 203, a control flow graph for the identified function is generated. In one or more embodiments of the invention, Step 203 is performed automatically by a software application. The control flow graph is generated by creating a series of nodes representing blocks of instructions in the function and connecting the nodes with directed edges indicating the flow of control between blocks. The control flow graph is generated to be path-sensitive by labeling each edge (x,y) in the control flow graph with a predicate bc(x,y). The predicate denotes under which condition a node will be executed, viz., the condition associated with the control flow.

In Step 205, a value flow graph for the identified function is generated. In one or more embodiments of the invention, Step 205 is performed automatically by a software application. The value flow graph is generated by creating a node for each variable in the function and connecting the nodes with directed edges indicating the flow of values between variables and/or the direct data dependencies between variables. The value flow graph is generated to be both flow-sensitive and context-sensitive. Flow-sensitivity takes into account the order of statements (e.g., instructions) in a program. For example, a flow-insensitive analysis may determine that variables x and y may refer to the same location, while a flow-sensitive analysis may determine that after the statement at line 20, variables x and y may refer to the same location. Flow-sensitivity may be achieved by performing a reachability analysis in computing indirect value flow edges, where a store instruction can flow to a load instruction only if the store can reach the load instruction in the control flow graph of the program without being rendered obsolete by another store instruction.

Context-sensitive analyses are interprocedural in that the calling context is considered when analyzing the target of a function call. In other words, using context information, an analysis may "jump back" to the original call site, whereas without context information, an analysis must be propagated back to all possible call sites, potentially losing precision. Context-sensitivity may be achieved using a combined function-cloning and context-free language (CFL) reachability analysis. The function is cloned at call sites where the function's value flow graph may be computed differently, and CFL-reachability is applied to ensure that value flows into one call site can only flow out from the same call site.

In Step 207, the value flow graph generated in Step 205 is sliced using a criterion and a direction to obtain a value flow graph slice for the function. In one or more embodiments of the invention, Step 207 is performed automatically by a software application. The value flow graph is sliced by removing any variables from the graph that are irrelevant to the analysis to be performed. The criterion and direction are selected based on the purpose of the analysis.

In Step 209, a sparse control flow graph is generated using the value flow graph slice from Step 207. In one or more embodiments of the invention, Step 209 is performed automatically by a software application. Constructing a sparse control flow graph includes determining the sets of instructions that are significant with respect to the desired analysis. In particular, the set of instructions are extracted from the control flow graph that have an effect on whether a particular error that is being analyzed by the error analysis occurs. An instruction has an effect on whether the error occurs when the instruction directly or indirectly prevents or causes the error.

Some standard definitions regarding control flow graphs should be discussed before proceeding. In a control flow graph, node u is said to be a "predecessor" of node v if an edge (u,v) in the control flow graph exists, denoted as u∈pred(v). Conversely, node v is called a "successor" of node u, denoted as v∈succ(v). Node u "dominates" a node v if all paths from the entry node entry to v include u. Node u is said to "strictly dominate" v if u dominates v and u≠v. The "immediate dominator" of node u, which may be denoted as idom(u), is the unique node that strictly dominates u, but does not dominate any other node that also strictly dominates u. The "dominance frontier" of node u, DF(u), is a set of nodes such that, for all v∈N, node u dominates a predecessor of v but does not strictly dominate v. The dominance frontier may be extended to a set of nodes by applying DF to each element in the set. The "iterated dominance frontier," denoted by $DF^+(u)$, is the reflexive transitive closure of the dominance frontier. The one step iteration given a set S is defined as: $DF^{i+1}(S) = DF(DF^i(S) \cup S)$. Thus $DF^+(u)$ equals $$\lim_{i \to \infty} DF^i(\{u\}).$$

Continuing with the example, in the sparse control flow graph resulting from Step 209, an edge (u,v) exists if and only if u is the immediate dominator of v in the set of nodes in the sparse control flow graph or v is a dominance frontier of u. No incoming edges exists for the nodes that have constant data-flow functions (i.e., nodes that produce the same data-flow value regardless of incoming values).

In Step 211, data-flow analysis is performed over the sparse control flow graph to obtain error candidates. In one or more embodiments of the invention, Step 211 is performed automatically by a software application. The mechanism for performing the data-flow analysis is dependent on the type of data flow analysis to be performed.

In Step 213, path conditions for each edge in the sparse control flow graph are computed for use in the path-sensitive data-flow analysis of Step 215. In one or more embodiments of the invention, Step 213 is performed automatically by a software application. Step 213 is detailed in the following discussion of FIG. 3, and the remaining steps of FIG. 2 are described immediately thereafter.

FIG. 3 shows a flowchart for computing path conditions of a function in accordance with one or more embodiments of the invention. The process shown in FIG. 3 may be used, for example, with the system of FIG. 1 to compute path conditions of the function.

As discussed above, each branch of a branch instruction has corresponding predicates defining branch conditions by which the particular branch is taken. In one or more embodiments of the invention, the computation of the path condition only considers branch conditions corresponding to atomic constraints, whereby a program variable is related by an inequality or equality relation to a constant. The remaining constraints may be simplified to true in accordance with one or more embodiments of the invention. In other embodiments of the invention, the remaining constraints are analyzed or otherwise simplified.

A path between two instructions may include one or more branches of different branch instructions. The path condition for a single path between two instructions is the intersection of the branch condition of the various one or more branches in the path. In other words, all of the branch conditions of the one or more branches in the path are equal to "TRUE" in order for the particular path to be taken or executed. The intersection may be referred to as a conjunction of branch conditions.

Further, multiple paths may exist between two instructions. Because any of the paths between the two instructions may be executed, the path condition between two instructions is a union of the path condition of the multiple paths. In other words, at least one of the path conditions for a single path between two instructions are equal to "TRUE" in order for the second instruction to be executed after the first instruction. The union may be referred to as a disjunction of path conditions of the various paths between two instructions.

Taken together, the path condition for multiple paths between two instructions may be expressed as a disjunction of the various conjunctions of branch conditions, otherwise known as disjunctive normal form. The path condition for multiple paths between two instructions may also be expressed as a conjunction of multiple disjunctions by using an algorithm to convert the path condition, expressed in disjunctive normal form, to conjunctive normal form. One or more embodiments of the invention simplify the path condition by simplifying the various disjunctions of branch conditions expressed in conjunctive normal form. Other embodiments of the invention may simplify the path condition by simplifying the various conjunctions of branch conditions expressed in disjunctive normal form. FIG. 3 shows a flowchart for computing the path condition and performing the simplification in accordance with one or more embodiments of the invention.

Mathematically, the above discussion may be represented as follows. The computation of path conditions considers atomic constraints of the form v~C where v is a program variable, ~ is one of the relational operations in the set $\{=, \neq, \leq, \geq\}$ and C is an integer constant. For a given node n in the sparse control flow graph, bc(n) is a condition of the above atomic constraint. Other types of constraints (arising from non-conditional statements) may be disregarded such that the constraints are evaluated to TRUE. For conditional branches, the atomic constraint is obtained from the branch condition.

Continuing with the mathematical discussion, given a control-flow path π, a path condition of π (denoted $PC_\pi(n_1, \ldots, n_m)$) is a condition φ such that, when π is the node sequence $n_1, \ldots, n_m$, the conjunction $\wedge_{1 \leq i \leq m} bc(n_i) \to \phi$. On the other hand, a path condition PC(x,y) between control points x and y is a condition ψ such that $PC(x,y) \to \psi$ for any control-flow path π from control point x to control point y. By these definitions, a path condition between x and y is a logic formula that may consist of conjunctions and disjunctions of atomic constraints on the program variables. PC(x,y) is satisfied by any execution path from node x to node y in the sparse control flow graph. Notably, the path conditions generated using the computational approach described below are conjunctive, using formula simplification.

In Step 301, a first instruction x and a second instruction y in the sparse control flow graph are identified. In one or more embodiments of the invention, FIG. 3 describes a recursive technique for computing path conditions. In other words, one or more steps of FIG. 3 refer to performing FIG. 3 again from the start node with a different first instruction and second instruction. Initially, prior to the first recursive call, the first instruction and the second instruction may be identified, for example, based on a possibility of a defect existing if the second instruction is executed after the first instruction. For each recursive call, the first instruction and the second instruction are defined in the step that includes the recursive call. In one or more embodiments of the invention, rather than performing a recursive technique, an iterative technique or other technique may be used. In one or more embodiments of the invention, the path condition for each combination of two instructions identified in the sparse control flow graph is computed using the remaining steps shown in FIG. 3.

In Step 303, a determination is made whether the edge (x,y) in the sparse control flow graph also appears in the original control flow graph of the function. If so, the process proceeds to Step 305. Specifically, a determination is made whether an edge exists from the node representing the first instruction to the node representing the second instruction in the control flow graph. If an edge exists, then execution of the second instruction may directly proceed after execution of the first instruction. If an edge does not exist, the process proceeds to Step 307.

In Step 305, based on the edge (x,y) appearing in the original control flow graph of the function, the path condition between x and y in the sparse control flow graph is defined as the path condition between x and y in the original control flow graph. In other words, the path condition of the edge between the nodes corresponding to the two instructions identified in Step 301 is the path condition for the two instructions. Following Step 305, the process proceeds to end. As discussed above, FIG. 3 presents a recursive discussion for computing the path condition. In one or more embodiments of the invention, once the flowchart proceeds to end for the current set of instructions identified in Step 301, the process may continue with Step 313 (including the recursive call to computing the path condition for FIG. 3), but with the set of instructions identified prior to the recursive call.

Returning to Step 303, consider the scenario in which a determination is made that the edge (x,y) does not appear in the original control flow graph of the function. In such a scenario, in Step 307, a determination is made whether first instruction x dominates second instruction y in the sparse control flow graph. For an edge (x,y) in the sparse control flow graph that does not appear in the original control flow graph, the first instruction x dominates the second instruction y, or the second instruction y is in the dominance frontier of the first instruction x. In other words, the first possibility (i.e., x dominates y) is that all control flows originating with the start node in the sparse control flow graph, and ending in the node representing the second instruction y, must pass through the node representing the first instruction x. The second possibility (i.e., y is in the dominance frontier of x) is that all control flow paths originating with the start node in the sparse control flow graph, and ending in a node immediately preceding the node representing the second instruction, must pass through the node representing the first instruction x. In both cases, the path condition of the sparse control flow graph represents the condition that must be satisfied in the control flow path from x to y and may be represented as PC(x,y). If x dominates y, the process proceeds to Step 309 in accordance with one or more embodiments of the invention. Otherwise, if y is in the dominance frontier of x, the process proceeds to Step 311 in accordance with one or more embodiments of the invention.

If a determination is made that the first instruction dominates the second instruction in the sparse control flow graph, in Step 309, the path condition (i.e., PC(x,y)) from the first instruction x to the second instruction y is recursively computed as a conjunction of all predicates between the first instruction x and the second instruction y. The path condition (i.e., PC(x,y)) may be computed by checking the dominator tree of the second instruction. An intermediate instruction may exist such that the first instruction dominates the intermediate instruction and the intermediate instruction dominates the second instruction. In other words, z may represent a third instruction that dominates the second instruction y and is itself (i.e., the third instruction z) dominated by the first instruction x. If one or more intermediate instructions exists, the predicate for each intermediate instruction is added to the path condition between the first instruction and the second instruction, such that the path condition for PC(x,y) requires that the added predicate is also satisfied. In other words, PC(x,y) includes bc(z) for any such z. In one or more embodiments of the invention, the construction of PC(x,y) may be determined quickly in practice as dominator trees are normally shallow. Following Step 309, the process proceeds to end.

Returning to Step 307, consider the scenario in which a determination is made that the first instruction x does not dominate the second instruction y in the original control flow graph. In such a scenario, y must be in the dominance frontier of x, or in other words, x dominates an immediate predecessor of y but not y itself. In this scenario, multiple paths may exist from the first instruction x to the second instruction y. From the definition of path condition, the computed path condition formula for all paths between the first instruction and the second instruction includes the path conditions for each specific path between the two instructions, such that any of the path conditions may be satisfied to execute the first instruction x prior to executing the second instruction y. In other words, PC(x,y) includes the path condition $PC_\pi(x,y)$ for each such path $\pi$. Therefore, for any intermediate instruction z, such that x dominates z and z is a predecessor of y, PC(x,y) includes PC(x,z). Accordingly, in Step 311, each intermediate instruction (z) is determined such that first instruction x dominates intermediate instruction z and intermediate instruction z is a predecessor of second instruction y in accordance with one or more embodiments of the invention.

In Step 313, for each such intermediate instruction determined in Step 311, the path condition between the first instruction x and the intermediate instruction z (i.e., PC(x,z)) is recursively computed as a conjunction of all predicates between the first instruction and the intermediate instruction. In other words, FIG. 3 is performed starting with Step 301 and having intermediate instruction z as the second instruction, such that the intermediate instruction z becomes instruction y in the recursion. In one or more embodiments of the invention, once the recursion performed in Step 313 completes for each intermediate instruction, the method proceeds in Step 315 with instruction y being the second instruction.

In Step 315, the path condition between the first instruction x and the second instruction y (i.e., PC(x,y)) is defined as a complex disjunction of PC(x,z) and PC(z,y) (i.e., PC(x,z) PC(z,y)) for each z identified in Step 311. The resulting path condition has disjunctive normal form. In mathematical notation, at this step PC(x,y) has the form $_ic_i$, where each $c_i$ is a formula of the form $_ja_j$ and each $a_j$ is an atomic constraint. In other words, the path condition is a complex disjunction that includes, for each control flow path in the path condition, a conjunction of predicates, which are atomic constraints.

In Steps 317 and 319, the resulting disjunction is then simplified by approximation. First, in Step 317, PC(x,y) is converted into conjunctive normal form to obtain a converted path condition that includes one or more disjunction(s) of atomic constraints. Mathematically represented, the resulting path condition is a complex conjunction of disjunctive clauses of the form a b, with a and b being atomic constraints of the syntax mentioned above.

Next, in Step 319, each disjunction of atomic constraints in the converted path condition is simplified in order to generate a simplified path condition. Specifically, each disjunctive clause is reduced to the weaker atomic constraint. In other words, of the two atomic constraints, the less constraining atomic constraint is selected to replace the disjunction and the remaining atomic constraint is ignored. If, of the two constraints, the weaker constraint cannot be calculated or determined, the disjunctive clause is simplified as TRUE. As a result of the approximation, the path condition between the first instruction x and the second instruction y becomes a purely conjunctive formula including no disjunctions. After Step 319 is complete, the process proceeds to end.

Returning to the discussion of FIG. 2, in Step 215, using the error candidates obtained in Step 211 and the path conditions computed in Step 213, path-sensitive data-flow analysis is performed over the sparse control flow graph to obtain a narrowed list of error candidates. In other words, prior to the path conditions computed in Step 213, a set of error candidates may exist based on the possibility of each of the paths being taken between a first instruction and a second instruction. However, after computing the path conditions and using data flow analysis, some paths may be infeasible (i.e., not possible to be performed) for a set of data values that correspond to the set of error candidates. In other words, the set of data values may prevent the error from occurring and, thus, limit the set of error candidates to a narrowed list of error candidates. More specifically, any error candidates in the original set of error candidates that are not possible based on the data flow analysis and the computed path conditions are excluded. Performing Step 215 may be dependent on the type of errors being analyzed. In one or more embodiments of the invention, Step 215 is performed automatically by a software application.

In Step 217, a function summary is generated for the value flow graph slice from Step 207 to enable inter-procedural analysis of caller functions. In one or more embodiments of the invention, Step 217 is performed automatically by a software application. In one or more embodiments of the invention, the function summary is added to a report. In one or more embodiments of the invention, any errors detected are presented by presenting the function summary or report. The function summary may include results of the data-flow analysis, including potential error(s) present in the analyzed source code, and/or one or more suggested corrections to the errors found during analysis. The report may be presented. For example, the report may be presented to a user (e.g., transmitted to a display, transmitted to a user's device, etc.), presented to a storage device for storage, presented to another application by being transmitted to the other application, or any combination thereof in accordance with one or more embodiments of the invention. In addition one or more embodiments of the invention may implement functionality to automate error correction based on the results of the data-flow analysis. In one or more embodiments of the invention, Step 217 may be performed only when the narrowed list of error candidates has at least one error. For example, if no errors exist, then the method may proceed to end prior to performing Step 217. In other embodiments, if the narrowed list of error candidates does not include error candidates, then the function summary may be that no errors detected. After Step 217 is complete, the process proceeds to end for the analyzed function.

The following is for example purposes only and not intended to limit the scope of the invention. An algorithm for computing path conditions according to one or more embodiments of the invention is expressed in pseudo-code below:

```
1   procedure COMPUTEPC(x,y)
2       if (x,y) in the original CFG then
3           return bc(x,y)
4       end if
5       if x dominates y in the original CFG then
6           z := immediate_dominator(y)
7           if (z,y) in the original CFG
8               return COMPUTEPC(x,z)    bc(z,y)
9           else return COMPUTEPC(x,z)
10      else
11          // y is in dominance frontier of x in the original CFG
12          φ := FALSE
13          for every z := predecessor(y) with x dominating z do
14              φ := φ  (COMPUTEPC(x,z)    bc(z,y))
15          end for
16          return SIMPLIFY(φ)
17      end if
18  end procedure
```

Lines 1 through 16 define a procedure COMPUTEPC that computes the path condition between a first instruction and a second instruction. COMPUTEPC has formal parameters x and y corresponding to the first instruction and the second instruction, respectively. At line 2, a determination is made whether an edge between the first instruction x and the second instruction y exists in the original control flow graph. If so, at line 3, the procedure returns the predicate corresponding to the edge between instructions x and y.

At line 5, a determination is made whether the first instruction x dominates the second instruction y in the original control flow graph. If so, at line 6, z is set equal to the intermediate instruction that immediately dominates the second instruction y. At line 7, a determination is made whether an edge between the intermediate instruction z and the second instruction y exists in the original control flow graph. If so, at line 8, the procedure recursively calls COMPUTEPC using the first instruction x and the intermediate instruction z. The procedure then returns the result of the recursive COMPUTEPC call conjoined with the predicate corresponding to the edge between the intermediate instruction x and the second instruction y.

At line 9, a determination has been made that an edge between the intermediate instruction z and the second instruction y does not exist in the original control flow graph. Accordingly, the procedure returns the result of a recursive call to COMPUTEPC using the first instruction x and the intermediate instruction z.

At line 10, a determination has been made that the first instruction x does not dominate the second instruction y. Accordingly, the second instruction y is in the dominance frontier of the first instruction x.

At line 12, path condition $\phi$ is initially set equal to "FALSE". At lines 13 and 14, for every intermediate instruction z that is both a predecessor of the second instruction y and is dominated by the first instruction x, $\phi$ is set equal to itself, disjoined with a conjunction of: (i) the path condition between the first instruction x and the intermediate instruction z as determined by a recursive call to COMPUTEPC; and (ii) the predicate corresponding to the edge between the intermediate instruction z and the second instruction y.

At line 16, the procedure returns the result of a procedure call to SIMPLIFY using the path condition $\phi$. Procedure SIMPLIFY returns the simplified path condition between the first instruction and the second instruction as detailed above.

The following is for example purposes only and not intended to limit the scope of the invention. An algorithm for the procedure SIMPLIFY according to one or more embodiments of the present invention is expressed in pseudocode below:

```
1    procedure SIMPLIFY(c)
2        // c is of the form (c₁  c₂  ...  cₙ)
3        c' := c₁
4        for i from n down to 2 do
5            c' := SIMPLIFYTWOCLAUSES(c'  cᵢ)
6        end for
7        return c'
8    end procedure
9
10   procedure SIMPLIFYTWOCLAUSES(c)
11       // c is of the form (c₁  c₂), where c1 and c2 are conjunctive
             clauses
12       c' := dnf_to_cnf(c)
13       // c' is of the form {(a₁  b₁)  (a₂  b₂)  ...  (aₘ  bₘ)}
14       X := TRUE
15       for i from 1 to m do
16           X := X    SIMPLIFYTWOCONSTRAINTS(aᵢ  bᵢ)
17       end for
18       return X
19   end procedure
20
21   procedure SIMPLIFYTWOCONSTRAINTS(c)
22       // c is of the form (a  b) where a and b are atomic
             constraints
23       if a → b then
24           return {b}
25       end if
26       if b → a then
27           return {a}
28       end if
29       return TRUE
30   end procedure
```

Lines 1 through 7 define a procedure SIMPLIFY that simplifies the path condition between a first instruction and a second instruction. SIMPLIFY has formal parameter c corresponding to the path condition between two instructions as computed by procedure COMPUTEPC. Path condition c is a complex disjunction of clauses $(c_1\ c_2\ \ldots\ c_n)$ where each clause is a conjunction of predicates. At line 3, local parameter c' is set equal to the first conjunctive clause in formal parameter c. At lines 4-5, every disjunction in the path condition c is simplified by iteratively calling the procedure SIMPLIFYTWOCLAUSES using the current value of c' and the next conjunctive clause in path condition c, and then storing the result in c'. At line 7, simplified path condition c' is returned as the result of the procedure call to SIMPLIFY.

Lines 10 through 19 define a procedure SIMPLIFYTWOCLAUSES that simplifies a disjunction of conjunctive clauses. SIMPLIFYTWOCLAUSES has a formal parameter c corresponding to a disjunction of two conjunctive clauses in the path condition. At line 12, disjunction c is converted from disjunctive normal form to conjunctive normal form and the result is assigned to path condition c'. At line 14, path condition X is set equal to TRUE. At lines 15-16, path condition X is set equal to a conjunction of each simplified disjunction of two constraints in path condition c' as determined by procedure calls to SIMPLIFYTWOCONSTRAINTS. At line 16, procedure SIMPLIFYTWOCLAUSES returns path condition X.

Lines 21 through 30 define a procedure SIMPLIFYTWOCONSTRANTS that simplifies two atomic constraints or predicates to the weaker of the two constraints. At line 23 a determination is made that constraint b is weaker, or less constraining, than constraint a. For example, if a is the constraint p>0, and b is the constraint p≥0, expression b is the weaker predicate because constraint b is satisfied by a greater number of values than constraint a, specifically the value p=0. As a result, at line 24 the procedure returns constraint b. At line 26 a determination is made that constraint a is weaker, or less constraining, than constraint b. As a result, at line 27 the procedure returns constraint a. At line 29, if the weaker of the two predicates a and b was not able to be determined, the procedure returns TRUE.

The following is for example purposes only and not intended to limit the scope of the invention. In the following example, consider the scenario in which detecting use-after-free errors is performed. Briefly, a use-after-free error is an error that occurs when a program attempts to read from a memory location after the memory location is freed. More specifically, given a heap object o and a free instruction free (v), the dereferencing of pointer w (e.g., *w) is a use-after-free error if free(v) is executed before the pointer dereference and an execution path exists such that both v and w refer to the same object o. Hence, checking use-after-free errors involves computing data flow information regarding whether a heap object has been freed, and simultaneously computing value flow information to check whether a dereference and a free instruction refer to the same object.

The first error-specific determination to be made is in selecting the value flow graph's criterion and direction. Let $I_{free}$ be the set of all instructions of the form free(v) for some variable v. The set of objects that may be freed is denoted as $O=\{o|o\Rightarrow *v, free(v) \in I_{free}\}$. Each object is identified using the instruction where the object is allocated. For use-after-free error checking, the analysis determines if any $o \in O$ is used after freed. Accordingly, for any memory object o in O, a forward slicing of the value flow graph is performed by removing, from the value flow graph, any variables whose values do not transitively depend on the values of some abstract location in O. The set V is the set of the remaining variables in the value flow graph.

Next, for use-after-free error checking in one or more embodiments of the invention, the sparse control flow graph should include: (i) all instructions in $I_{free}$; (ii) the set of all instructions that define a variable in V; (iii) the set of all instructions that prevent any value flow from an object $o \in O$ to some $v \in V$; and (iv) the iterated dominance frontier (defined below) of the above three sets. The set of all instructions that define a variable in V may be denoted as $I_{vfg}$. The set of all instructions that prevent any value flow from an object $o \in O$ to some $v \in V$ may be denoted as $I_{blk}$.

The data-flow analysis for a use-after-free error may proceed as follows. The property on whether an object o has been freed is determined, as well as the property on whether o can reach a pointer variable v. Both properties may be summarized using the data-flow fact freed(o,v) where $o \in O$ and $v \in V$. The analysis associates a fact freed(o,v) to a control point x if at control point x, o's value may flow to v after o is freed. Dereferencing v with freed(o,v) holding constitutes a use-after-free error.

The following data-flow equations recursively define two mappings IN and OUT that respectively map control points before and after a statement to sets of data-flow facts. In one or more embodiments of the invention, the optimal solutions for both mappings correspond to the maximum fixed point of the equations:

$$IN_x = \begin{cases} \text{NULL} & \text{if } pred(x) = \text{NULL} \\ \bigcup_{y \in pred(x)} OUT_y & \text{otherwise} \end{cases} \quad (1)$$

$$OUT_x = \begin{cases} IN_x \cup \{freed(o, v) \mid o \Rightarrow *v\} & \text{if } x \text{ is } free(v) \in I_{free} \text{ and } v \in V \\ IN_x - \{freed(o, v) \mid w \Rightarrow_{must} v, v \in V\} & \text{if } x \text{ is } w = \ldots \in I_{blk} \end{cases} \quad (2)$$

In equations (1) and (2), $IN_x$ is an emptyset if the control flow graph node x has no predecessor. Otherwise, $IN_x$ is the union of the data-flow facts in $OUT_y$ of all x's predecessors y. At the program point x where o is freed by free(v), the data-flow fact freed(o,v) is included in the set $OUT_x$ whenever o may flow to v. In one or more embodiments of the invention, o may flow to v only when v∈V. In the other case when v is assigned a different value, o can no longer flow to the program variables that must receive that value from this point. Hence the corresponding data-flow fact freed(o,v) is removed from $OUT_x$.

The preceding data-flow analysis, when performed on the set of instructions in the sparse control flow graph, results in a set of error candidates that include instructions associated with freed facts involving variables in the sliced value flow graph. However, thus far, the analysis lacks path-sensitivity, and another round of data-flow analysis follows.

The data-flow analysis is extended to be path-sensitive by expanding the abstract domain consisting of only the atoms freed(o,v) into a set of pairs (freed(o,v), φ) where φ is a condition such that, when there are feasible paths from to a free instruction free(v), some of such paths satisfy φ. Note that when all such paths satisfy φ, then φ is the path condition from o to the instruction free(v). The new analysis may be formalized as a new data-flow equation:

$$IN_x = \begin{cases} \text{NULL} & \text{if } pred(x) = \text{NULL} \\ \{(freed(o, v) \text{simplify}(\vee_{freed(o,v),\varphi) \in X} \varphi)) \mid \\ \quad X = \bigcup_{y \in pred(x)} OUT_y \} & \text{otherwise} \end{cases} \quad (3)$$

$$OUT_x = \begin{cases} IN_x \cup \{freed(o, v), PC(o, x) \mid o \Rightarrow *v\} & \text{if } x \text{ is } free(v) \in I_{free}, \\ & v \in V, \text{ and } \\ & PC(o, x) \text{ is satisfiable} \\ IN_x - \{(freed(o, v), \varphi) \mid w \Rightarrow_{must} v, v \in V\} & \text{if } x \text{ is } w = \ldots \in I_{blk} \end{cases} \quad (4)$$

The difference between equations (3) and (4) and equations (1) and (2) supra is simply the addition of the path condition PC(x,y) denoting a condition that must be satisfied along the flow path from x to y. For each free instruction, the analysis computes the condition under which the heap object o is freed. At a program point where different data-flow values meet, the simplification function simplify is applied to simplify the disjunction that arises from combining separate path conditions into a conjunction.

Equations (3) and (4) compute freed(o,v) that holds at every program point in the sparse control flow graph. To answer the question whether the statement x in the original program which dereferences v causes a use-after-free error, both freed(o,v) should hold for some o, and the constraints along the value flow path from o to x, that is, the path condition PC(o,x), must be capable of being satisfied. In equations (3) and (4), PC(o,x) is composed incrementally whenever each statement is analyzed.

One of ordinary skill in the art will know how to adjust the above-mentioned steps for different analyses involving detecting bug types other than use-after-free errors. Namely, the criteria for slicing the value flow graph, the set of instructions included in the sparse control flow graph, and the data-flow facts used in the analysis are changed according to error type. For example, to detect potential data races, the analysis should compute the state of whether a lock is acquired before shared data are used. Therefore, the analysis involves instructions that create or destroy threads, instructions that access shared variables, and instructions acquire or release locks.

The following example of path-sensitive data-flow analysis, specifically tailored for use-after-free error checking, is for explanatory purposes only and not intended to limit the scope of the invention. Consider the following C language source code, including line numbers and labeled program points F, $U^1$, $U^2$, and $U^3$:

```
1    Item {int val, void * buff};
2    void check(int flag, Item * I) {
3        char * buf1, buf2, buf3;
4        Item * t1, t2;
5        t1 = I;
6        t2 = I;
7        buf1 = t1->buf;
8        if (flag == 0) {
9    F:         free(buf1);
10             t1->buf = 0;
11       }
12       if (flag != 0) {
13   U1:        * (buf1) = ...;
14       }
15       buf2 = buf1;
16   U2:   *(buf2) = ...;
17       buf3 = t2->buf;
18       if (buf3) {
19   U3:       *(buf3) = ...;
20       }
21   }
```

Without path-sensitivity, standard data-flow analysis concludes that, at program point $U^1$, the heap object referred to by pointer buf1 has been freed (by the free instruction free(buf1) at F. Hence a false use-after-free error will be reported at that instruction. On the other hand, the same heap object may be referred to by three different pointers, buf1, buf2, and buf3. The use-after-free error at $U^2$ will not be reported if the value flows between those pointer variables are not properly handled. In order to prevent such false positives and unreported errors, the above function is first represented using the standard control flow graph together with a value flow graph.

FIG. 4 shows an example path-sensitive control flow graph for the above source code in accordance with one or more embodiments of the invention. The nodes in the graph are shown as boxes including instructions, and directed edges in the graph, depicting control flow, are labeled with conditional statements (i.e. predicates or atomic constraints).

FIG. 5 shows an example value flow graph for the above source code in accordance with one or more embodiments of the invention. Only value flows of pointer variables are shown, as that is sufficient to analyze use-after-free errors with value flows in one or more embodiments of the invention. As depicted, the formal parameter I directly flows to local variables t1 and t2. The auxiliary variable I->buf is introduced as a dereference of the formal argument I. I->buf flows to both buf1 and buf3, and buf1 flows to buf2.

Once generated, the value flow graph is sliced to remove variables whose values do not transitively depend on the values of objects that may be freed. For the example, the value flow graph slice, once completed, includes the abstract location I->buf, as well as the local variables buf1, buf2, and buf3.

FIG. 6 shows an example sparse control flow graph for the above source code in accordance with one or more embodiments of the invention. The sparse control flow graph is generated to include only those instructions relevant to the analysis. For the example, the sparse control flow graph includes the instructions that define variables buf1, buf2, and buf3; i.e., $I_{vfg}$={buf1=t1->buf, buf2=buf1, buf3=t2->buf}. The instruction "t1->buf=0" is included, as the instruction disallows the heap object flow to buf3, hence $I_{blk}$= {t1->buf=0}. The set of free instructions, $I_{free}$={free(buf)}, is also included in the sparse control flow graph. FIG. 6 shows the final sparse control flow graph which includes the above three sets as well as the set's dominance frontier.

The first data-flow analysis is now performed using the sparse control flow graph to obtain an error candidate list. For the example, the instruction "free(buf1)" includes the data-flow facts freed(I->buf, buf1), freed(I->buf, buf2), and freed (I->buf buf3). Recall that pre-computed value-flow relations are used in order to compute the facts that should be included. However, immediately the instruction "t1->buf=0" disallows the abstract location I->buf to flow to buf3 from this point. Hence, $IN_{U3}$ includes only freed(I->buf, buf3) and its dereferencing at program point $U_3$ is actually safe. However, the use-after-free errors via buf1 and buf2 will be reported.

These two remaining potential errors are then further checked by the path-sensitive data-flow analysis algorithm. Due to the guarded path conditions, the dereference via pointer buf2 is also safe and path-sensitivity is performed to remove such false positives. For the example, the following statement is obtained: x: free(buf1), $OUT_x$->flag= 0 freed(I->next, buf1). At the statement y : *buf1 = . . . , the constraint flag≠0 would have been added into the path condition, which, due to contradiction with flag=0, results in unsatisfiability. Therefore, use-after-free of buf1 exists in the program. The function has now been analyzed to completion yielding no false positives.

Figure 7:
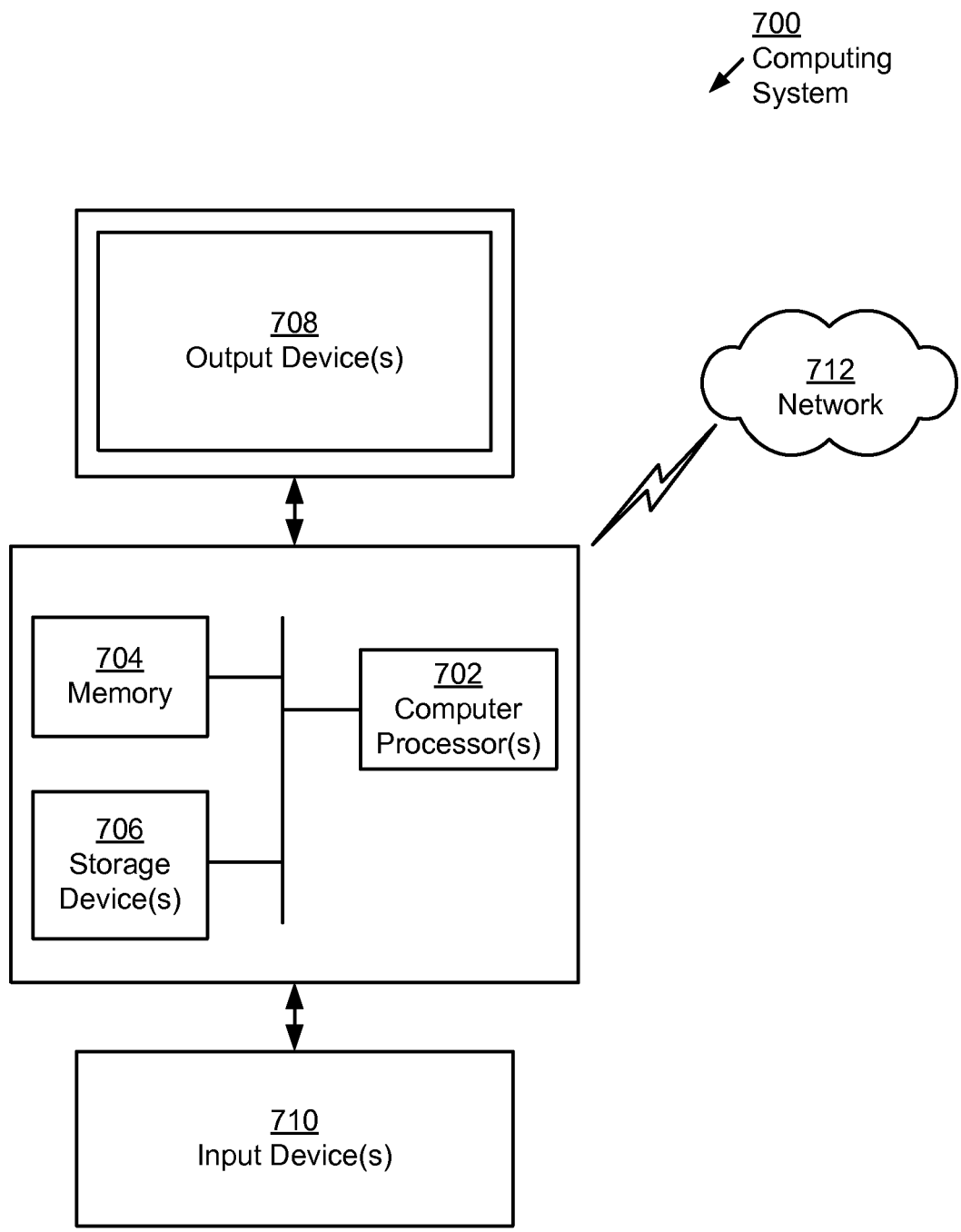
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (502), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing path-sensitive data-flow analysis for use in error checking functions, comprising:
   identifying at least a first instruction and a second instruction in a control flow graph of a function, wherein the first instruction and the second instruction are connected by at least a first control flow path and a second control flow path;
   defining a path condition between the first instruction and the second instruction as a complex disjunction comprising a first conjunction of predicates for the first control flow path and a second conjunction of predicates for the second control flow path;
   converting the path condition into conjunctive normal form to obtain a converted path condition, wherein the converted path condition comprises a disjunction of atomic constraints;

generating a simplified path condition by simplifying the disjunction of atomic constraints in the converted path condition to a value, wherein the value is a weaker predicate of the disjunction of atomic constraints;

analyzing the function using the simplified path condition to detect an error; and presenting the error.

2. The method of claim 1, wherein the value is true.

3. The method of claim 1, further comprising:
generating a control flow graph of the function;
generating a value flow graph of the function;
slicing the value flow graph into a value flow graph slice using a criterion and a direction; and
generating the sparse control flow graph using the value flow graph slice.

4. The method of claim 1, wherein presenting the error comprises generating a function summary using the value flow graph slice.

5. The method of claim 1, wherein the error is one of the group consisting of a use-after-free error, a data race error, and a dangling pointer error.

6. A system for performing path-sensitive data-flow analysis for use in error checking functions, comprising:
memory;
a computer processor for executing a static analysis application, wherein the static analysis application is stored in memory and comprises a path analyzer, the path analyzer causing the computer processor to:
identify at least a first instruction and a second instruction in a sparse control flow graph of a function, wherein the first instruction and the second instruction are connected by at least a first control flow path and a second control flow path,
define a path condition between the first instruction and the second instruction as a complex disjunction comprising a first conjunction of predicates for the first control flow path and a second conjunction of predicates for the second control flow path,
convert the path condition into conjunctive normal form to obtain a converted path condition, wherein the converted path condition comprises an disjunction of atomic constraints,
generate a simplified path condition by simplifying the disjunction of atomic constraints in the converted path condition to a value, wherein the value is a weaker predicate of the disjunction of atomic constraints, and
analyze the function using the simplified path condition to detect an error; and
a data repository comprising at least the sparse control flow graph.

7. The system of claim 6, wherein the value is true.

8. The system of claim 6, wherein the static analysis application further comprises a report generator, the report generator causing the computer processor to generate a function summary using the value flow graph slice.

9. The system of claim 6, wherein the error is one of the group consisting of a use-after-free error, a data race error, and a dangling pointer error.

10. The system of claim 6, wherein the static analysis application further comprises:

a model generator, the model generator causing the computer processor to:
generate a control flow graph of the function,
generate a value flow graph of the function, and
generate the sparse control flow graph of the function; and
a slicing module, the slicing module causing the computer processor to:
slice the value flow graph into a value flow graph slice using a criterion and a direction,
wherein the sparse control flow graph is based on the value flow graph slice.

11. The system of claim 6, wherein the data repository further comprises source code comprising the function, a control flow graph, and a value flow graph.

12. A non-transitory computer readable medium storing instructions for performing path-sensitive data-flow analysis for use in error checking functions, the instructions executable on a computer processor and comprising functionality to:
identify at least a first instruction and a second instruction in a sparse control flow graph of a function, wherein the first instruction and the second instruction are connected by at least a first control flow path and a second control flow path;
define a path condition between the first instruction and the second instruction as a complex disjunction comprising a first conjunction of predicates for the first control flow path and a second conjunction of predicates for the second control flow path;
convert the path condition into conjunctive normal form to obtain a converted path condition, wherein the converted path condition comprises a disjunction of atomic constraints;
generate a simplified path condition by simplifying the disjunction of atomic constraints to a value, wherein the value is a weaker predicate of the disjunction of atomic constraints;
analyze the function using the simplified path condition to detect an error; and
present the error.

13. The non-transitory computer readable medium of claim 11, wherein the value is true.

14. The non-transitory computer readable medium of claim 11, wherein presenting the error to the user comprises generating a function summary using the value flow graph slice.

15. The non-transitory computer readable medium of claim 11, wherein the error is one of the group consisting of a use-after-free error, a data race error, and a dangling pointer error.

16. The non-transitory computer readable medium of claim 11, wherein the instructions further comprise functionality to:
generate a control flow graph of the function;
generate a value flow graph of the function;
slice the value flow graph into a value flow graph slice using a criterion and a direction; and
generate the sparse control flow graph of the function using the value flow graph slice.

17. The non-transitory computer readable medium of claim 16, wherein the criterion is heap deallocation.

* * * * *